H. L. PERKINS.
HAY SPREADER.

No. 103,771. Patented May 31, 1870.

United States Patent Office.

HENRY L. PERKINS, OF KINSMAN, OHIO.

Letters Patent No. 103,771, dated May 31, 1870.

IMPROVEMENT IN HAY-SPREADERS.

The Schedule referred to in these Letters Patent and making part of the same.

*To all whom it may concern:*

Be it known that I, HENRY L. PERKINS, of Kinsman, in the county of Trumbull and State of Ohio, have invented a certain new and improved Hay-Tedder; and I do hereby declare that the following is a full, clear, and complete description of the same, reference being had to the accompanying drawing making part of this specification, in which

Figure 1:
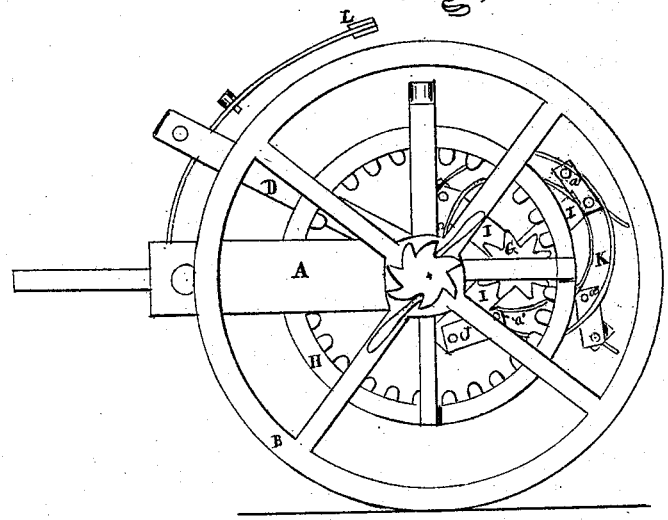
Figure 2:
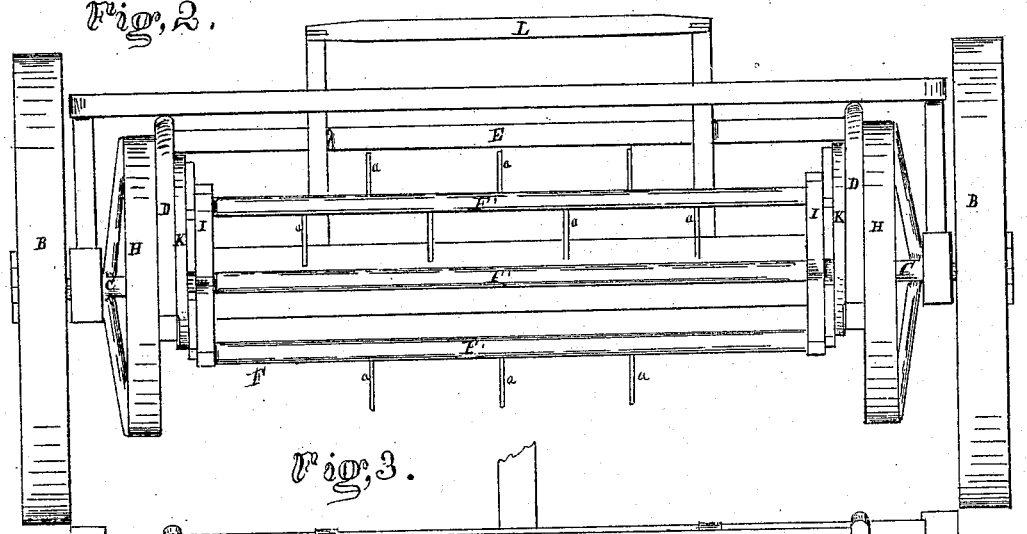
Figure 3:
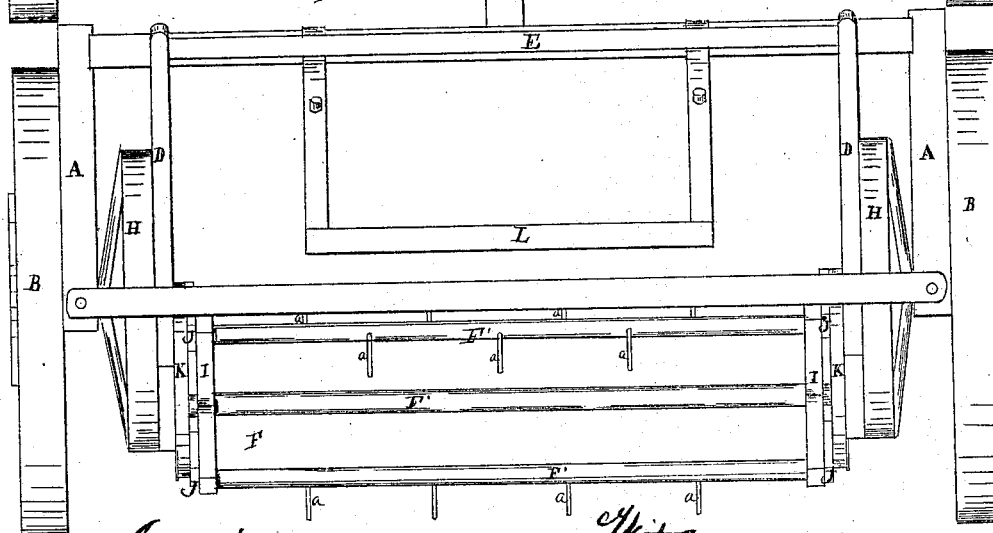

Drawing,

Figure 1 is a side view of the tedder.
Figure 2, a view of the rear side.
Figure 3, a top view.
Like letters of reference refer to like parts in the several views.

Objective.

This invention has for its object the turning or spreading of hay in order to facilitate the drying of the same, by means of a revolving reel armed with a series of teeth or prongs, whereby the undried hay is lifted from the ground and scattered about, as hereinafter more fully described.

Descriptive.

In fig. 3, A represents a frame mounted upon the wheels B on short axle-trees C, each wheel having its own separate and independent axle, and to which it is secured in a rigid manner.

On the inner end of each axle is hung a lever, D. Said levers are connected to each other by a bar, E, whereby the levers are actuated simultaneously, for a purpose hereinafter shown.

In the lower ends of said levers is journaled a reel, F, in the bars of which is inserted a series of prongs *a*.

The reel is made to revolve by a pinion, G, fig. 1, secured to the shaft of the reel, and made to engage with the inside gear-wheel H fixed to the axle of each wheel, and made to revolve conjointly therewith as the machine moves forward in the course of its work.

Besides the rotating movement given to the reel as a whole, there is obtained to each bar F' thereof a partial rotating motion on its own axis, in the manner as follows:

The bars are each pivoted in the ends of the cross I, forming the ends of the reel.

To the projecting end of the journal of each bar is secured an arm, J, fig. 1.

From the free end of said arm projects a pin or stud, *a'*, with the circular guide K, which, as the reel revolves, courses around therein, giving to the bars a partial rotary movement, so that the prongs, when nearest to the ground, have nearly a vertical direction thereto, but, as the reel continues to revolve, they gradually leave such vertical direction until arriving at the top, at which place they have assumed a horizontal position, and gradually approach the vertical position again as they descend, by the continued revolution of the wheel.

Operative.

The practical operation of this machine is as follows:

The operator takes his place on the cross-piece L, and, as the machine moves forward, the wheels A give motion to and cause the reel to revolve, the prongs pick up the hay and scatter it behind upon the ground lightly and evenly, thereby exposing it more directly to the drying influence of the sun and air.

The special movement given to each bar of the reel, as above described, is to prevent the hay from lodging on the prongs and being carried over by the reel to the front of the machine, which it would do were bars rigidly attached to the ends, thereby causing the prongs to ascend with their points more or less upward, and prevent the hay from sliding off from them.

It will be obvious that, as the special movement of the bars is in the opposite direction from that of the reel, the prongs will, as a consequence, have their points inclined downward on rising from the ground, thereby allowing the hay to fall off in the rear of the machine.

By means of the levers D referred to, the reel can be raised more or less above the ground as the thickness of the hay to be tedded may require, by depressing the front end, thereby lifting the rear end to which the reel is attached, as above said.

Claim.

What I claim as my invention, and desire to secure by Letters Patent, is—

The arrangement of the adjustable lever D, (pivoted in the stud-axles C,) having the eccentric guides K, and reel-shaft bearings attached thereto, and the reel F, having pivoted bars F' and crank-arms J, all constructed and operating substantially as set forth.

HENRY L. PERKINS.

Witnesses:
 W. H. BURRIDGE,
 J. H. BURRIDGE.